United States Patent [19]

Schreckendgust

[11] 3,718,466

[45] Feb. 27, 1973

[54] MAGNETIC DEVELOPMENT

[75] Inventor: Jay George Schreckendgust, Franklin, Ohio

[73] Assignee: A. E. Staley Manufacturing Company, Decatur, Ill.

[22] Filed: July 12, 1971

[21] Appl. No.: 161,958

[52] U.S. Cl. ..................................96/48 R, 117/93.2
[51] Int. Cl. ..........................................G03c 5/24
[58] Field of Search ...........96/48 R, 39, 88; 117/93.2

[56] References Cited

UNITED STATES PATENTS

| | | | |
|---|---|---|---|
| 3,413,141 | 11/1968 | Friedman | 117/93.2 |
| 3,637,385 | 1/1972 | Hayes et al. | 96/48 |

*Primary Examiner*—J. Travis Brown
*Assistant Examiner*—Richard L. Schilling
*Attorney*—William H. Magidson and Charles J. Meyerson

[57] ABSTRACT

Forming ferromagnetic patterns which comprise exposing a non-magnetic base bearing a solid, light-sensitive organic layer having a thickness of at least 0.2 micron, capable of developing a $R_d$ of 0.2 to 2.2 by powder embedment imaging with physical force, to actinic radiation in predetermined areas corresponding to an optical pattern; continuing the exposure to establish a potential $R_d$ of 0.2 to 2.2 by powder embedment imaging with physical force; applying to said layer of organic material, free flowing ferromagnetic powder particles having a diameter along at least one axis of at least about 0.3 micron, but less than 25 times the thickness of said first organic layer; while the layer is at a temperature below the melting point of said organic layer, embedding said ferromagnetic particles in a stratum at the surface of said organic layer without physical force by applying a magnetic field substantially perpendicular to said light-sensitive layer; and removing non-embedded particles from said organic layer to develop a discrete permanent pattern of ferromagnetic material.

6 Claims, No Drawings

MAGNETIC DEVELOPMENT

This invention relates to a method of forming ferromagnetic patterns.

In commonly assigned application Ser. No. 796,847, filed Feb. 5, 1969, now U.S. Pat. 3,637,385, in the names of Hayes, Jones & Thompson, which is incorporated by reference, there is described a method of deformation imaging, wherein a light-sensitive layer is exposed to light in image-receiving manner and developed by physically embedding powder particles as a monolayer in a stratum at the surface of said light-sensitive layer. As explained therein, the powder particles are embedded into the light-sensitive layer using physical force, preferably containing a lateral component of force, such as by rubbing powder particles across the surface of the exposed light-sensitive layer.

While this process is susceptible of accurate control due to the fact that only a monolayer of developing powders is deposited on the light-sensitive layer, this process has the disadvantage that physical force must be applied in the development step and the amount of powder particles that can be deposited in any image area is limited. In those cases where it is desirable to apply a material having a functional effect, such as a magnetic characteristic, as opposed to a decorative effect, the total amount of powder particles deposited per unit area is limited by the particle size of the developing powder, light-sensitive layer thickness and surface area to be developed.

The principle object of this invention is to provide a method of developing light-sensitive elements of the type described in now U.S. Patent 3,637,385, without employing physical force. A further object of this invention is to provide a practical method of developing the light-sensitive element of now U.S. Patent 3,637,385, with ferromagnetic powders, wherein said ferromagnetic powders can be deposited in a concentration greater than that which can be obtained by the technique of now U.S. Patent 3,637,385. Other objects appear hereinafter.

In the description that follows, the phrase "powder-receptive, solid, light-sensitive organic layer" is used to described an organic layer which is capable of developing a predetermined contrast or reflection density ($R_d$) upon exposure to actinic light and embedment of black powder particles of a predetermined size in a single stratum at the surface of said organic layer. While explained in greater detail below, the $R_d$ of a light-sensitive layer or $R_{dp}$ of a positive-acting, light-sensitive layer are photometric measurements of the difference in degree of blackness of undeveloped areas and black-powder developed areas. The terms "physically embedded" and "physical force" are used to indicate that powder particles are subjected to an external force other than, or in addition to, either electrostatic force or gravitational force resulting from dusting or sprinkling powder particles on a substrate. The terms "-mechanically embedded" and "mechanical force" are used to indicate that the powder particle is subjected to a manual or machine force, such as lateral to-and-fro or circular rubbing or scrubbing action. The term " embedded" is used to indicated that the powder particle displaces at least a portion of the light-sensitive layer and is held in the depression so created, i.e. at least a portion of each particle is below the surface of the light-sensitive layer.

The objects of this invention are attained by developing the light-sensitive layers of Patent 3,637,385, by applying ferromagnetic particles to the exposed light-sensitive element without using physical force and embedding the ferromagnetic particles into the light-sensitive layer with a magnetic field positioned under the light-sensitive layer, preferably substantially perpendicular (at an angle of between 70° and 110°) to the light-sensitive layer. Scanning electron micrographs indicate that whereas the flat side of powder particles are preferentially embedded into the light-sensitive layer using the technique of Patent 3,637,385, the point side of powder particles are embedded into the light-sensitive layer using the process of this invention. Accordingly, when acicular ferromagnetic particles are employed in the process of this invention, more ferromagnetic particles can be embedded per unit area than in the method of Patent 3,637,385. Typically, the amount of ferromagnetic material deposited in the image areas can be increased by a factor of three. It is essential for the purpose of this invention that no physical force containing a lateral component be employed during or before the application of the substantially perpendicular magnetic field. If a physical force containing a lateral component is applied to the powder particles prior to or during the application of the magnetic field, the ferromagnetic particles are embedded into the light-sensitive layer in the same manner as that described in the technique of Patent 3,637,385 and the advantages of this invention cannot be attained.

The process of this invention can be employed advantageously to produce or reproduce magnetic records, tapes, computer data, etc. These articles are particularly useful as permanent magnetic records which cannot be erased by the subsequent application of a magnetic field to the developed image areas.

For use in this invention, the solid light-sensitive organic layer, which can be an organic material in its naturally occurring or manufactured form or a mixture of said organic material with plasticizers and/or photoactivators for adjusting the powder receptivity and sensitivity to actinic radiation, must be capable of developing a $R_d$ of at least 0.2 by the process of application Ser. No. 796,847 using the prescribed black developing powder. The powder-receptive areas of the layer (unexposed areas of a positive-acting, light-sensitive layer or the exposed areas of a negative-acting material) must have a softness such that suitable particles can be embedded into a stratum at the surface of the light-sensitive layer by the mild physical forces described in Patent No. 796,847. If the $R_d$ of the light-sensitive layer is below about 0.2 by the method described in Patent No. 796,847, the light-sensitive layer is too hard to accept a suitable concentration of ferromagnetic particles by the method of this invention. In those cases where the light-sensitive elements of this invention are to be pressed against the surface of an original in a contact exposure, the light-sensitive layer must have a $R_d$ no higher than 2.2 by the method of Patent 796,847 in order to prevent the surfaces of the light-sensitive layer and the original from sticking together or being damaged when heated slightly by high intensity light radiation. For most uses, it is preferred that the light-sensitive layer have a maximum $R_d$ under the conditions of development of 2.2 in order to maintain film integrity during machine handling. Accordingly, for use in this invention, the light-sensitive layer must be capable of developing a $R_d$ of at least 0.2 or preferably 0.4 to 2.0 using a suitable black developing powder under the conditions of development of Patent 796,847.

The $R_d$ of the positive-acting, light-sensitive layers of Patent 3,637,385, which can be called $R_{dp}$, is a photometric measurement of the reflection density of a black powder developed light-sensitive layer after a positive-acting, light-sensitive layer has been exposed to sufficient actinic radiation to convert the exposed areas into a substantially powder-non-receptive state (clear the background). The $R_d$ of a negative-acting, light-sensitive layer, which is called $R_{dn}$, is a photometric measurement of the reflection density of a black-powder developed area, after a negative-acting, light-sensitive layer has been exposed to sufficient radiation to convert the exposed area into a powder-receptive area.

In somewhat greater detail, the reflection density of the solid, positive-acting, light-sensitive layer ($R_{dp}$) is determined by coating the light-sensitive layer on a white substrate, exposing the light-sensitive layer to sufficient actinic radiation image-wise to clear the background of the solid, positive-acting, light-sensitive layer, applying a black powder (prepared from 77 percent Pliolite VTL and 23 percent Neo Spectra carbon black in the manner described below) to the exposed layer, physically embedding said black powder under the conditions of development as a monolayer in a stratum at the surface of said light-sensitive layer and removing the non-embedded particles from said light-sensitive layer. The developed organic layer containing black powder embedded image areas and substantially powder free non-image areas is placed in a standard photometer having a scale reading from 0 to 100 percent reflection of incident light or an equivalent density scale, such as on Model 500A photometer of the Photovolt Corporation. The instrument is zeroed (0 density; 100 percent reflectance) on a powder free non-image area of the light-sensitive organic layer and an average $R_d$ reading is determined from the powder developed area. The reflection density is a measure of the degree of blackness of the developed surface which is relatable to the concentration of particles per unit area. The reflection density of a solid negative-acting, light-sensitive layer ($R_{dn}$) is determined in the same manner except that the negative-acting, light-sensitive layer is exposed to sufficient actinic radiation to convert the exposed area into a powder-receptive state. If the $R_d$ under the conditions of development is between 0.2 (63.1 percent reflectance) and 2.2 (0.63 percent reflectance), or preferably between 0.4 (39.8 percent reflectance) and 2.0 (1.0 percent reflectance), the solid, light-sensitive organic material deposited in a layer is suitable for use in the method of Patent 3,637,385 and in the method of this invention.

Although the $R_d$ of all light-sensitive layers is determined by using the aforesaid black developing powder and a white substrate, the $R_d$ is only a measure of the suitability of a light-sensitive layer for use in this invention.

Since the $R_d$ of any light-sensitive layer is dependent on numerous factors other than the chemical constitution of the light-sensitive layer, the light-sensitive layer is best defined in terms of its $R_d$ under the development conditions of application Patent 3,637,385. The positive-acting, solid, light-sensitive organic layers useful in this invention must be powder-receptive in the sense that the aforesaid black developing powder can be embedded as a monoparticle layer into a stratum at the surface of the unexposed layer to yield $R_{dp}$ of 0.2 to 2.2 (0.4 to 2.0 preferably) under the predetermined conditions of development and light-sensitive in the sense that upon exposure to actinic radiation the most exposed areas can be converted into the non-particle receptive state (background cleared) under the predetermined conditions of development. In other words, the positive-acting, light-sensitive layer must contain a certain inherent powder-receptivity and light-sensitivity. The positive-acting, light-sensitive layers are apparently converted into the powder-non-receptive state by a light-catalyzed hardening action, such as photopolymerization, photocrosslinking, photooxidation, etc. Some of these photohardening reactions are dependent on the presence of oxygen, such as the photooxidation of internally ethylenically unsaturated acids and esters while others are inhibited by the presence of oxygen, such as those based on the photopolymerization of the vinylidene groups of polyvinylidene monomers alone or together with polymeric materials. The latter require special precautions, such as storage in oxygen-free atmosphere or oxygen-impermeable cover sheets. For this reason, it is preferable to use solid, positive-acting, film-forming, organic materials containing no terminal ethylenic unsaturation.

The negative-acting, solid, light-sensitive organic layers useful in this invention must be light-sensitive in the sense that, upon exposure to actinic radiation, the most exposed areas of the light-sensitive layer are converted from a non-powder-receptive state under the predetermined conditions of development to a powder-receptive state under the predetermined conditions of development. In other words, the negative-acting, light-sensitive layer must have a certain minimum light-sensitivity and potential powder-receptivity. The negative-acting, light-sensitive layers are apparently converted into the powder-receptive state by a light-catalyzed softening action, such as photodepolymerization.

In general, the positive-acting, solid, light-sensitive layers useful in this invention comprise a film-forming organic material in its naturally occurring or manufacture form or a mixture of said organic material with plasticizers and/or photoactivators for adjusting powder-receptivity and sensitivity to actinic radiation. Suitable positive-acting, film-forming organic materials which are not inhibited by oxygen, include internally ethylenically unsaturated acids, such as abietic acid, rosin acids, partially hydrogenated rosin acids, such as those sold under the name Staybelite resin, wood rosin, etc., esters of internally ethylenically unsaturated acids, methylol amides of maleated oils such as described in U.S. Pat. No. 3,471,466, phosphatides of the class described in application Ser. No. 796,841, filed on Feb. 5, 1969 (now U.S. Patent 3,595,031) in the name of Hayes, such as soybean lecithin, partially hydrogenated lecithin, dilinolenyl-alpha-lecithin, etc., partially hydrogenated rosin acid esters, such as those sold under the name Staybelite esters, rosin modified alkyds, etc.; polymers of ethylenically unsaturated monomers, such as vinyltoluene-alpha methyl styrene copolymers, polyvinyl cinnamate, polyethyl methacrylate, vinyl acetate-vinyl stearate copolymers, polyvinyl pyrrolidone, etc.; coal tar resins, such as coumarone-indene resins, etc.; halogenated hydrocarbons, such as chlorinated waxes, chlorinated polyethylene, etc. Positive-acting, light-sensitive materials, which are inhibited by oxygen include mixtures of polymers, such as polyethylene terephthalate/sebacate, or cellulose acetate or acetate/butyrate, with polyunsaturated vinylidene monomers, such as ethylene glycol diacrylate or dimethacrylate, tetraethylene glycol diacrylate or dimethacrylate, etc.

Although numerous positive-acting, film-forming organic materials have the requisite light-sensitivity and powder-receptivity at predetermined development temperatures, it is generally preferable to compound the film-forming organic material with photoactivator(s) and/or plasticizer(s) to impart optimum powder-receptivity and light-sensitivity to the light-sensitive layer. In most cases, the light-sensitivity of an element can be increased many fold by incorporation of a suitable photoactivator capable of producing free-radicals which catalyze the light-sensitive reaction and reduce the amount of photons necessary to yield the desired physical change.

Suitable photoactivators capable of producing free-radicals include benzil, benzoin, Michlers ketone, diacetyl, phenanthraquinone, p-dimethylaminobenzoin, 7, 8-benzoflavone, trinitrofluorenone, desoxybenzoin, 2,3-pentanedione, dibenzylketone, nitroisatin, di(6-dimethylamino-3-pyridyl)methane, metal naphthenates, N-methyl-N-phenylbenzylamine, pyradyl, 5-7 dichloroisatin, azodiisobutyronitrile, trinitroanisole, chlorophyll, isatin, bromoisatin, etc. These compounds can be used in a concentration of .001 to 2 times the weight of the film-forming organic material 0.1–200 percent the weight of the film-former). As in most catalytic systems, the best photoactivator and optimum concentration thereof is dependent upon the film-forming organic material. Some photoactivators respond better with one type of film-former former and may be useful over rather narrow concentration ranges whereas others are useful with substantially all film-former in wide concentrations ranges.

The acyloin and vicinal diketone photoactivators, particularly benzil and benzoin, are preferred. Benzoin and benzil are effective over wide concentration ranges with substantially all film-forming, light-sensitive organic materials. Benzoin and benzil have the additional advantage that they have a plasticizing or softening effect on film-forming, light-sensitive layers, thereby increasing the powder-receptivity of the light-sensitive layers. When employed as a photoactivator, benzil should preferably comprise at least 1 percent by weight of the film-forming organic material (0.01 times the film-former weight).

Dyes, optical brighteners and light absorbers can be used alone or preferably in conjunction with the aforesaid free-radical producing photoactivators (primary photoactivators) to increase the light-sensitivity of the light-sensitive layers of this invention by converting light rays into light rays of longer lengths. For convenience, these secondary photoactivators (dyes, optical brighteners and light absorbers) are called "superphotoactivators." Suitable dyes, optical brighteners and light absorbers include 4-methyl-7-dimethylaminocourmarin, Calcofluor yellow HEB (preparation described in U.S. Pat. No. 2,415,373), Calcofluor white SB super 30080, Calcofluor, Uvitex W conc., Uvitex TXS conc., Uvitex RS (described in Textil-Rundschau 8 [1953], 339), Uvitex WGS conc., Uvitex K, Uvitex CF conc., Uvitex W (described in Textil-Rundschau 8, [1953]340), Aclarat 8678, Blancophor OS, Tenopol UNPL, MDAC S–8844, Uvinul 400, Thioflavine TGN conc., aniline yellow – S (low conc.), Setoflavine T 5506–140, Auramine 0, Calcozine yellow OX, Calcofluor RW, Calcofluor GAC, Acetosol yellow 2 RLS–PHF, eosine bluish, Chinoline yellow – P conc., Ceniline yellow S (high conc.), Anthracene blue violet fluorescence, Calcofluor white MR, Tenopol PCR, Uvitex GS, acid-yellow-T-supra, Acetosol yellow 5 GLS, Calcocid Or. Y Ex. Conc., diphenyl brilliant flavine 7 GFF, Resoform fluorescent yellow 3 CPI, eosine yellowish, Thiazole Fluorescor G, pyrazlone orange YB–3, and National FD&C yellow. Individual superphotoactivators may respond better with one type of light-sensitive organic film-former and photoactivator than with others. Further, some photoactivators function better with certain classes of brighteners, dyes and light absorbers. For the most part, the most advantageous combinations of these materials and proportions can be determined by simple experimentation.

As indicated above, plasticizers can be used to impart optimum powder-receptivity to the light-sensitive layer. With the exception of lecithin, most of the film-forming, light-sensitive organic materials useful in this invention are not powder-receptive at room temperature but are powder-receptive above room temperature. Accordingly, it is desirable to add sufficient plasticizer to impart room temperature (15° to 30°C.) or ambient temperature powder receptivity to the light-sensitive layers and/or broaden the $R_{dp}$ range of the light-sensitive layers.

While various softening agents, such as dimethyl siloxanes, dimethyl phthalate, glycerol, vegetable oils, etc. can be used as plasticizers, benzil and benzoin are preferred since, as pointed out above, these materials have the additional advantage that they increase the light-sensitivity of the film-forming organic materials. As plasticizer-photoactivators, benzoin and benzil are preferably used in a concentration of 1 to 80 percent by weight of the film-forming solid organic material.

The preferred positive-acting, light-sensitive film-formers containing no conjugated terminal ethylenic unsaturation include the esters and acids of internally ethylenically unsaturated acids, particularly the phosphatides, rosin acids, partially hydrogenated rosin acids and the partially hydrogenated rosin esters. These materials, when compounded with suitable photoactivators, preferably acyloins or vicinal diketones, together with superphotoactivators, require less than 2 minutes exposure to clear the background of light-sensitive layers and can be developed to yield ferromagnetic powder patterns having the desired configuration.

In general, the negative-acting, light-sensitive layers useful in this invention comprise a film-forming organic material in its naturally occurring or manufactured form, or a mixture of said organic material with plasticizers and/or photoactivators for adjusting powder-receptivity and sensitivity to actinic radiation. Suitable negative-acting, film-forming organic materials include n-benzyl linoleamide, dilinoleyl-alpha-lecithin, castor wax (glycerol 12-hydroxy-stearate), ethylene glycol monohydroxy stearate, polyisobutylene, polyvinyl stearate, etc. Of these, castor wax and other hydrogenated ricinoleic acid esters (hydroxystearate) are preferred. These materials can be compounded with plasticizers and/or photoactivators in the same manner as the positive-acting, light-sensitive film-forming organic materials.

In somewhat greater detail, magnetic patterns are produced by applying a thin layer of solid, light-sensitive, film-forming organic material having a potential $R_d$ of at least 0.2 (i.e. capable of developing a $R_{dp}$ or $R_{dn}$ of at least 0.2) to a non-magnetic base by any suitable means dictated by the nature of the film-forming organic material and/or the base (hot-melt, draw down, spray,roller coating or air knife, flow-, dip-, curtain-coating, etc.) so as to produce a reasonably smooth homogeneous layer of from 0.1 to 40 microns thick employing suitable solvents, as necessary. Suitable bases for use in this invention comprise transparent or opaque film bases composed of one or more flexible layers. Suitable layers include cellulose esters (cellulose acetate, cellulose propionate, cellulose butyrate, etc.), polyesters (polyethylene terephthalate), nylon, polystyrene, polypropylene, corona discharge polypropylene, etc. In general, the base employed should have relatively good dimensional stability in the sense that it does not stretch when wound up under tension.

The light-sensitive layer must be at least 0.1 micron thick, and preferably at least 0.4 micron, in order to hold ferromagnetic powders during development. If the light-sensitive layer is less than 0.1 micron, or the powder diameter is more than 25 times layer thickness, the light-sensitive layer does not hold the powder with the necessary tenacity. In general, as layer thickness increases, the light-sensitive layer is capable of holding larger particles. However, as the light-sensitive layer thickness increases, it becomes increasingly difficult to maintain film integrity during handling. ACcordingly, the light-sensitive layer must be from 0.1 to 40 microns, preferably from 0.4 to 10 microns.

The light-sensitive layers of predetermined thickness are preferably applied to the base from an organic solvent (hydrocarbon, such as hexane, heptane, benzene, etc.; halogenated hydrocarbon, such as chloroform, carbon tetrachloride, 1,1,1-trichloroethane, trichloroethylene, etc.). If desired, the light-sensitive layers can be deposited from suitable aqueous emulsions. The thickness of the light-sensitive layer can be varied as a function of the concentration of the solids dissolved in the solvent.

After the base is coated with a suitable solid, light-sensitive organic layer, a latent image is formed by exposing the element to actinic radiation in image-receiving manner in predetermined areas corresponding to an optical pattern for a time sufficient to provide a potential $R_d$ of at least 0.2. The light-sensitive elements can be exposed to actinic light through a suitable optical master of the sound track or information to be reproduced. If desired, a magnetic reader may be employed to obtain an optical master from a magnetic tape, disc, etc. In general, optimum speed is attained when a preformed optical master is employed.

As indicated above, the latent images are preferably produced from positive-acting, light-sensitive layers by exposing the element in image-receiving manner for a time sufficient to clear the background, i.e. render the exposed areas non-powder-receptive. As explained in Patent 3,637,385, the amount of actinic radiation necessary to clear the background varies to some extent with developer size and development conditions. Due to these variations, it is often desirable to slightly overexposed both positive-and negative-acting, light-sensitive elements.

After the light-sensitive element is exposed to actinic radiation for a time sufficient to clear the background of the positive-acting, light-sensitive layer or establish a potential $R_{dn}$ of 0.2, a ferromagnetic powder is applied to the light-sensitive layer. The ferromagnetic powder, which has a diameter or dimension along one axis of at least 0.3 is applied without physical or machine force containing a lateral component and embedded into the light-sensitive layer by applying a suitable magnetic field. The developing powder can be virtually any shape, such as spherical, platelets, etc., provided it has a diameter along at least one axis of at least 0.3 micron. With the exception of spherical particles, more ferromagnetic material is deposited per unit area than in the method of Patent 3,637,385. In the case of spherical particles, essentially the same amount of ferromagnetic material is deposited by both processes.

The ferromagnetic powders include iron powders, iron oxides, nickel alloys, cobalt alloys, etc. These powders can be applied in a substantially pure form or on a suitable carrier. Carriers, such as resinous or polymeric materials, can be employed to regulate the particle size of the ferromagnetic powders or, as explained below, to improve the wear resistance of the ferromagnetic tapes. The ferromagnetic powders can be ball-milled with polymeric carrier in order to coat the carrier with active ingredient, or, if desired, they can be blended above the melting point of resinous carrier, ground to suitable size and classified.

The black developing powder for determining the $R_d$ of a light-sensitive layer, which can also be employed as a suitable light-absorbing pigment in this invention is formed by heating about 77 percent Pliolite VTL (vinyltoluene-butadiene copolymer) and 23 percent Neo Spectra Mark I (carbon black having a particle size of 0.008 micron) at a temperature above the melting point of the resinous carrier, blending on a rubber mill for 15 minutes and then grinding in a Mikro-atomizer.

The developing powders useful in this invention contain particles having a diameter or dimension along at least one axis from 0.3 to 40 microns, preferably from 0.5 to 10 microns, with powders of the order of 1 to 15 microns, being best for light-sensitive layers of 0.4 to 10 microns. Maximum particle size is dependent on the thickness of light-sensitive layer while minimum particle size is independent of layer thickness. For the most part, powders having a diameter more than 25 times the thickness of the light-sensitive layer have the disadvantage that they cannot be permanently embedded into the light-sensitive layers unless overcoated or fixed in some manner. For the most part, particles over 40 microns are not detrimental to image development provided the developing powder contains a reasonable concentration of powder particles under 40 microns, which are preferably less than 25 times the light-sensitive layer thickness.

Although developing powders over 40 microns are not detrimental to image development, the presence of particles under 0.3 micron diameter along all axes can be detrimental. In general, it is preferable to employ developing powders having substantially all powders having a diameter along at least one axis not less than 0.3 micron, preferably more than 0.5 micron, since particles less than 0.3 micron tend to embed in non-image areas. As the particle size of the smallest powder in the developer increases, less exposure to actinic radiation is required to clear the background.

In somewhat greater detail, the ferromagnetic powder is applied directly to the light-sensitive layer, while the powder-receptive areas of the light-sensitive layer are in at most only a slightly soft condition and said layer is at a temperature below the melting point of the layer and powder. For example, the ferromagnetic powder can be dusted onto the light-sensitive layer or cascaded as it passes along a fixed path. Alternatively, the light-sensitive layer may be conveyed through a reservoir of ferromagnetic powders. In any case, the powder is distributed over the area to be developed without applying physical or mechanical force having a lateral component and is embedded into a stratum at the surface of the light-sensitive layer by applying a magnetic field to the light-sensitive layer. The generator of the magnetic field is normally positioned directly under the light-sensitive layer being developed, so that the field id preferably substantially perpendicular (70° to 110°) to the light-sensitive layer. During embedment, the light-sensitive layer may be disposed in a plane or positioned around a suitable geometric solid, such as a circular or elliptical drum. When the latter technique is employed, the magnetic field can advantageously be positioned inside the drum.

The magnetic field, which should be at least 100 gauss, preferably at least 500 gauss, is applied to the light-sensitive layer bearing ferromagnetic powder for a time sufficient to embed the ferromagnetic powder in the powder-receptive areas. The stronger the magnetic field the less time it takes to embed the ferromagnetic particles into the light-sensitive layer. For example, with a strong magnetic field of the order of 1 to 3 kilogausses, powder embedment is virtually instantaneous, being achieved as the light-sensitive layer bearing ferromagnetic powder passes through the magnetic field at a rapid rate. On the other hand, weaker magnetic fields of the order of 100 gauss can require from 1 to 2 minutes to achieve the necessary embedment. The use of stronger magnetic fields has the additional advantage that the ferromagnetic imaged layer does not require activation by passing through a magnetic field since the sound or informational track is produced simultaneously with the embedment of the ferromagnetic particles by the magnetic field.

After the embedment of ferromagnetic powder, excess ferromagnetic powder may remain on the surface of the light-sensitive layer which because the powder has not been sufficiently embedded into, or attached to, the light-sensitive layer. This may be removed in any convenient way, as by wiping with a clean pad or brush, by vacuuming, by vibrating, by air doctoring, by air jets, etc., and recovered. After the excess ferromagnetic powder is removed, the ferromagnetic image areas can be activated, when necessary, by passing the element through a strong magnetic field of at least 500 gauss.

If desired, the ferromagnetic imaged layer can be sprayed with a thin, clear polymeric layer, such as an acrylic lacquer, to provide sufficient wear resistance or to permit repeated operation in typical playback equipment. Alternatively, where the ferromagnetic developing powder is on a resinous or polymeric carrier, additional wear resistance can be attained by fusing the carrier to the base with heat or solvent vapors for the carrier.

In the event that the sound or information track or tape produced in this manner is erased or wiped out, the sound or informational track is not lost but can be reinstated by merely passing the tape through a suitable magnetic field, such as a permanent magnet.

The following examples are merely illustrative and should not be construed as limiting the scope of this invention.

EXAMPLE 1

A Mylar (polyethylene terephthalate) tape was flow coated with a solution comprising 0.96 gram Staybelite Ester No. 10 (partially hydrogenate rosin ester of glycerol), 0.24 gram benzil and 0.144 gram 4-methyl-7-dimethylaminocoumarin, dissolved in 100 mls. Chlorothene (1,1,1-trichloroethane) to form a one micron light-sensitive layer. The sensitized side of the element was placed in contact with an optical informational line master and exposed to actinic radiation in a vacuum frame for about 1 minute. The unexposed areas were developed by positioning the light-sensitive layer over a perpendicular 3-kilogauss magnetic-field generator and dusting magnetic recording ferric oxide IRN–110 over the light-sensitive layer. The iron oxide was embedded into the unexposed areas of the light-sensitive Staybelite layer by the magnetic field virtually instantaneously. The non-embedded iron oxide was removed from the surface of the light-sensitive element using an air jet and the tape was spray coated with a thin, clear acrylic lacquer.

A full gain output of 1.8 volts was developed at the output of a tape recorder for the reproduced magnetic tape. An oscilloscope analysis of a 40-bit reproducibility sampling showed that the "0" bit had a mean of 12 ± 12percent and a "1" bit of 88 ± 12 percent. At a playback speed of 3 ¾ ips, an edge rise time of 50 percent per 0.001 inch was measured. The storage density was about 1,500 bits per inch.

When this example was repeated using the techniques of a Patent 3,637,385, employing physical force having a lateral component without using a magnetic field, and the magnetic tape was activated, after acrylic lacquer spraying, by pulling it through a 3-kilogauss field at a speed exceeding 120 inches per second, the resultant tape had a full gain output of 1.1 volts. An oscilloscope analysis of a 40-bit reproducibility sampling showed that the "0" bit had a mean of 16 ± 16 percent and a "1" bit of 84 ± 16 percent. At a playback speed of 3 ¾ ips, an edge rise time of 59 percent per 0.001 inch was measured and the storage density was about 1,400 bits per inch. Chemical analysis showed that the tape imaged by the method of this invention had three times as much iron oxide per unit area as the tape imaged by the method of Patent 3,637,385. Scanning electron micrographs of the two tapes showed that the tape prepared by magnetic development had clusters of iron oxide particles with the ends of the ferromagnetic particles embedded into the light-sensitive layer and resembled very much a beecomb. On the other hand, the ferromagnetic particles embedded into the light-sensitive layer by the method of Patent 3,637,385, had the flat sides of the ferromagnetic powders embedded into the light-sensitive layer. From an optical point of view, there was fuller coverage of the light-sensitive layer by the physically developed tape while the magnetically developed tape had more gaps and spaces in the developed areas. However, the amount of ferromagnetic powder developed per area was substantially higher using magnetic development.

Essentially the same results are obtained by replacing the Staybelite ester composition described above with an optical master of a sound track and (1) 1.25 grams Staybelite Ester No. 5 (partially hydrogenated rosin ester of glycerol), 1.875 grams benzil and 0.3125 gram 4-methyl-7-dimethylaminocoumarin, dissolved in 100 mls. Chlorothene, (2) 1.25 grams Staybelite Rosin F (partially hydrogenated rosin acids), 0.1 gram benzil and 0.3125 gram 4-methyl-7-dimethylaminocoumarin, dissolved in 100 mls. Chlorothene, (3) 1.25 grams wood rosin, 0.15 gram benzil and 0.3125 gram 4-methyl-7-diethylaminocoumarin, dissolved in 100 mls Chlorothene, and (4) 1.25 grams abietic acid, 0.15 gram benzil and 0.3125 gram 4-methyl-7-dimethylaminocoumarin dissolved in 100 mls. chlorothene.

EXAMPLE II

The magnetic tape reproduced in Example I was wiped out using an alternating magnetic field and then reestablished by passing the tape through a 3-kilogauss magnetic field completely reproducing the original informational track.

EXAMPLE III

Essentially the same results are obtained when Example I is repeated using iron developing powder in place of ferric oxide.

EXAMPLE IV

Essential the same results are obtained when Example I is repeated using a continuous tone master in place of the line master.

Since many embodiments of this invention may be made and since many changes may be made in the embodiments described, the foregoing is interpreted as illustrative and the invention is defined by the claims appended hereafter.

What is claimed is:

1. A method of forming ferromagnetic patterns which comprises:

1. exposing a non-magnetic base bearing a solid, light-sensitive organic layer having a thickness of at least 0.2 micron, capable of developing a $R_d$ of 0.2 to 2.2 by powder embedment imaging with physical force, to actinic radiation in predetermined areas corresponding to an optical pattern;
2. continuing the exposure to establish a potential $R_d$ of 0.2 to 2.2 by powder embedment imaging with physical force;
3. applying to said layer of organic material, free-flowing ferromagnetic powder particles having a diameter along at least one axis of at least about 0.3 micron, but less than 25 times the thickness of said first organic layer;
4. while the layer is at a temperature below the melting point of said organic layer, embedding said ferromagnetic particles in a stratum at the surface of said organic layer without physical force by applying a magnetic field substantially perpendicular to said light-sensitive layer; and
5. removing non-embedded particles from said organic layer to develop a discrete permanent pattern of ferromagnetic material.

2. The process of claim 1, wherein said magnetic field is at least 500 gauss.

3. The process of claim 2, wherein said base is a substantially dimensionally stable film.

4. The process of claim 2, wherein said ferromagnetically imaged base is lacquered.

5. The process of claim 2, wherein said ferromagnetic particles comprise a polymeric or resinous carrier and said carrier is fused after development.

6. The process of claim 2, wherein said light-sensitive layer is positive-acting.

* * * * *